A. W. KIEFER.
PIPE WRENCH.
APPLICATION FILED OCT. 21, 1920.
1,380,566.
Patented June 7, 1921.
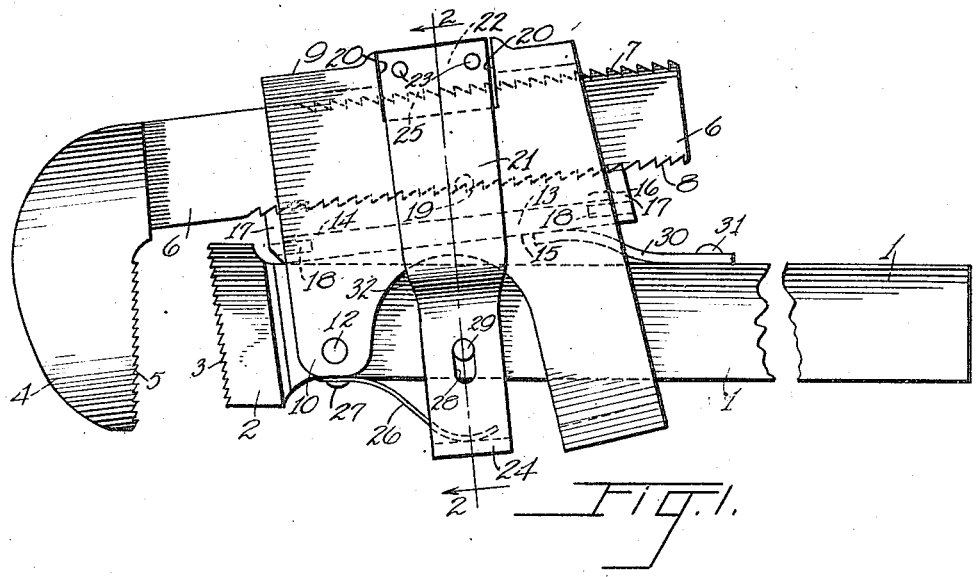
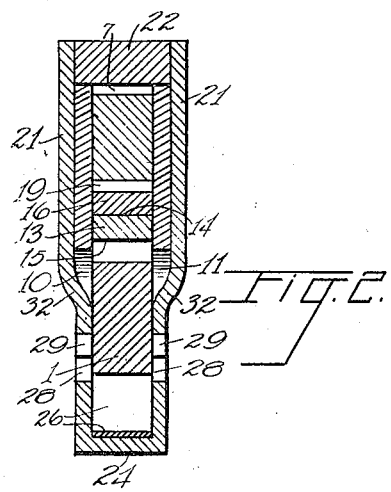
INVENTOR
A. W. KIEFER
BY Munn & Co
ATTORNEYS

UNITED STATES PATENT OFFICE.

ARTHUR WELLINGTON KIEFER, OF CHICAGO, ILLINOIS.

PIPE-WRENCH.

1,380,566. Specification of Letters Patent. Patented June 7, 1921.

Application filed October 21, 1920. Serial No. 418,392.

*To all whom it may concern:*

Be it known that I, ARTHUR W. KIEFER, a citizen of the United States, and a resident of Chicago, in the county of Cook and State of Illinois, have invented a new and useful Improvement in Pipe-Wrenches, of which the following is a full, clear, and exact description.

My invention relates to improvements in pipe wrenches, and it consists in the combinations, constructions, and arrangements herein described and claimed.

An object of my invention is to provide an improvement over the device covered by Patent No. 1,353,246, issued to me September 21, 1920, said improvements consisting in the provision of means for permitting a yielding movement of one of the jaws thereof relative the other jaw to more positively grip a circular body, such as a pipe, between the jaws.

A further object of my invention is to provide a device of the type described that can be instantly adjusted to work of varying sizes.

A further object of my invention is to provide a device of the type described that is effective for the purpose intended, not likely to get out of order easily and thoroughly practical commercially.

Other objects and advantages will appear in the following specification, and the novel features of the invention will be particularly pointed out in the appended claims.

My invention is illustrated in the accompanying drawings, forming part of this application, in which—

Figure 1 is a side elevation of the device,

Fig. 2 is a section along the line 2—2 of Fig. 1.

In carrying out my invention, I provide a handle 1 having an enlarged end portion 2 provided with teeth 3 in its end to form a fixed jaw. A coöperating jaw 4 provided with teeth 5 has a shank 6 with teeth 7 and 8 in its opposite or upper and lower sides. A guiding and retaining member 9 is formed with downwardly depending spaced apart lugs 10 and 11 arranged to straddle the handle 1 adjacent the jaw 2 and pivoted at 12 to the handle 1. The guiding and retaining member 9 is formed with a partition 13 extending longitudinally the length thereof intermediate its upper and lower walls, thereby providing an upper compartment 14 and a lower compartment 15. The shank 6 is disposed in the compartment 14 and is held with its upper side adjacent the interior upper wall of the guiding and retaining member 9 by means of a spacing member 16 that is mounted on the partition 13 and secured rigidly thereto in any suitable manner as by means of the integral lugs 17—17 that are bent to overlap the ends of the partition 13 and are secured thereto by pins 18—18. The spacing member 16 is provided with teeth 19 in its upper side adapted to engage with teeth 8 in the lower side of the shank 6.

The guiding and retaining member has its upper wall cut away at 20 intermediate its length. A U-shaped keeper having arms 21—21 diverging outwardly at 32 is fashioned with elongated openings 28 through said arms at a spaced distance from the web 24. Pins or studs 29—29 project laterally from the handle 1 through the elongated openings 28—28, wherefore the U-shaped keeper is positioned with the ends of the arms 21—21 substantially flush with the upper wall of the guiding and retaining member 9. An insert 22 held between the arms 21—21 adjacent their ends by pins 23—23 is therefore disposed in the recess formed at 20 in the upper wall of the guiding and retaining member 9. The insert 22 has teeth 25 in its lower side adapted to engage with the teeth 7 in the upper side of the shank 6 when the keeper is held in the position shown by a spring 26 that has one end secured to the lower side of the handle 1 and its other end arranged to bear against the web 24. At this time, the guiding and retaining member 9 is held in the position shown relative the handle 1 by a spring 30 that has one end secured to the upper side of the handle 1 and its other end arranged to bear upwardly against the partition 13.

From the foregoing description of the various parts of the device, the operation thereof may be readily understood. When it is desired to adjust the wrench to work, such as a pipe of any given size, the thumb of the hand gripping the handle 1 is placed upon the upper rearward portion of the guiding and retaining member 9 and pressure is applied to move the latter downwardly about its pivot against the tension of the spring 30. The teeth 7 disengage the teeth 25 and the shank 6 may then be moved in either direction to accommodate work of a given size. It is to be observed that engagement of the teeth 7 with the teeth 25 while the teeth 8 engage the teeth 19 will normally lock the shank 6 against movement to separate the jaws 2 and 4, but that the jaw 4 may be forced toward the jaw 2, the teeth 7 escaping the teeth 25 and the teeth 8 escaping the teeth 19. When the jaws are adjusted to the work, operation of the wrench in an ordinary manner will cause the object held to be more firmly gripped, since the handle 1 is permitted to move about its pivot 12 against the tension of the spring 26, the pins 29—29 slidably moving in the elongated openings 28—28.

The device may be instantly adjusted to objects of varying sizes and provides an effective means for the purpose intended. Since the device is simple in construction and strongly built, it is not likely to get out of order easily under ordinary service conditions.

I claim:

1. A pipe wrench comprising a handle having one end formed to provide a jaw, a guiding and retaining member having a pivotal connection with said handle, a second jaw arranged to oppose said first named jaw and provided with a shank slidable in said guiding and retaining member, said shank being provided with teeth in its upper and lower side, a spacing member secured to said guiding and retaining member and provided with teeth in its side adjacent the lower teeth in said shank, and means carried by said handle for causing the teeth on said spacing member to normally engage the teeth on said shank to prevent movement of said shank in one direction, said means having teeth adapted to engage the upper teeth of said shank.

2. A pipe wrench comprising a handle having one end provided with teeth and constituting a jaw, a guiding and retaining member having a pivotal connection with the handle, a second jaw provided with teeth arranged to oppose the teeth in said first named jaw and having a shank slidable in said guiding and retaining member, said shank being formed with teeth in its upper and lower side, a spacing member secured to said guiding and retaining member and provided with teeth in its side adjacent the lower teeth in said shank, and means carried by said handle for normally preventing the movement of said guiding and retaining member about its pivot, said means having teeth adapted to engage the upper teeth of said shank, wherefore the teeth in said spacing member and in said means engage with the teeth in said shank to prevent movement of said shank in one direction.

3. A pipe wrench comprising a handle having one end provided with teeth and constituting a jaw, a guiding and retaining member having a pivotal connection with the handle, a second jaw provided with teeth arranged to oppose the teeth in said first named jaw and having a shank slidable in said guiding and retaining member, said shank being formed with teeth in its upper and lower side, a spacing member secured to said guiding and retaining member and provided with teeth in its side adjacent the lower teeth in said shank, and means carried by said handle for normally preventing the movement of said guiding and retaining member about its pivot, said means having teeth adapted to engage the upper teeth of said shank, wherefore the teeth in said spacing member and in said means engage with the upper and lower teeth in said shank to prevent movement of said shank in one direction, said means being yieldable to permit a movement of said handle about its pivot to cause said jaws to more firmly grip a piece of work positioned therebetween.

4. A pipe wrench comprising a handle having one end provided with teeth and constituting a jaw, said handle having studs projecting from the opposite sides thereof, a guiding and retaining member having a pivotal connection with said handle and being formed with a recess in its wall above the point of its pivotal connection with said handle, a second jaw provided with teeth arranged to oppose the teeth in said first named jaw and having a shank slidable in said guiding and retaining member, said shank being formed with teeth in its upper and lower sides, a spacing member secured to said guiding and retaining member and provided with teeth in one side adapted to engage with the teeth in the under side of said shank, spring means carried by the handle and arranged to bear against said spacing member to tend to move the guiding and retaining member upwardly about its pivot, a keeper having arms arranged to straddle said guiding and retaining member, said arms being formed with elongated opposed openings adapted to receive the studs projecting from the opposite sides of said handle, an insert secured between the ends of said arms and arranged to enter the recess in said guiding and retaining member, said insert being formed with teeth adapted to engage with the teeth in the upper side of said shank, and spring means carried by said handle and arranged to bear against said keeper to cause the teeth in said insert to normally engage with the teeth in the upper side of said shank.

5. A pipe wrench comprising a handle having one end provided with teeth and constituting a jaw, a guiding and retaining member pivotally carried by said handle, said member having a rectangular bore extending therethrough, the lower surface of the bore being serrated, a shank slidably disposed in said guiding and retaining member and having a serrated upper and lower edge, the lower teeth being adapted to engage the teeth in the bore, said shank having a jaw-shaped head, a spring pressed keeper having a serrated edge adapted to engage the upper serrated side of said shank, whereby said shank is yieldingly held in engagement with the serrated portion of said retaining member.

ARTHUR WELLINGTON KIEFER.